United States Patent
Zuo et al.

(10) Patent No.: US 9,372,201 B2
(45) Date of Patent: Jun. 21, 2016

(54) YAW AND PITCH ANGLES

(71) Applicant: ALSTOM RENEWABLE TECHNOLOGIES, Grenoble (FR)

(72) Inventors: Delong Zuo, Lubbock, TX (US); John Schroeder, Lubbock, TX (US); Carlo Enrico Carcangiu, Barcelona (ES); Justin C. Morse, Palmyra, VA (US)

(73) Assignee: ALSTOM RENEWABLE TECHNOLOGIES, Grenoble (FR)

(*) Notice: Subject to any disclaimer, the term of this patent is extended or adjusted under 35 U.S.C. 154(b) by 0 days.

(21) Appl. No.: 14/664,705

(22) Filed: Mar. 20, 2015

(65) Prior Publication Data

US 2015/0276786 A1  Oct. 1, 2015

Related U.S. Application Data

(60) Provisional application No. 61/972,869, filed on Mar. 31, 2014.

(51) Int. Cl.
| | |
|---|---|
| *F03D 9/00* | (2016.01) |
| *H02P 9/04* | (2006.01) |
| *G01P 5/02* | (2006.01) |
| *F03D 7/02* | (2006.01) |
| *G01S 17/58* | (2006.01) |
| *F03D 11/00* | (2006.01) |

(52) U.S. Cl.
CPC .............. *G01P 5/02* (2013.01); *F03D 7/0204* (2013.01); *F03D 7/024* (2013.01); *F03D 7/0224* (2013.01); *F03D 9/002* (2013.01); *F03D 11/0091* (2013.01); *G01S 17/58* (2013.01); *F05B 2270/32* (2013.01); *F05B 2270/321* (2013.01); *F05B 2270/326* (2013.01); *F05B 2270/328* (2013.01); *F05B 2270/329* (2013.01); *F05B 2270/8042* (2013.01); *Y02E 10/723* (2013.01)

(58) Field of Classification Search
USPC .................................................... 290/44, 55
See application file for complete search history.

(56) References Cited

U.S. PATENT DOCUMENTS

| | | | | |
|---|---|---|---|---|
| 6,320,272 | B1 * | 11/2001 | Lading | F03D 7/0224 290/44 |
| 7,436,083 | B2 * | 10/2008 | Shibata | F03D 1/025 290/44 |
| 7,692,322 | B2 * | 4/2010 | Wakasa | F03D 7/0224 290/44 |
| 7,870,783 | B2 * | 1/2011 | Yoshida | G01P 5/06 290/44 |

(Continued)

FOREIGN PATENT DOCUMENTS

EP  2 607 689  6/2013

*Primary Examiner* — Pedro J Cuevas
(74) *Attorney, Agent, or Firm* — Squire Patton Boggs (US) LLP

(57) ABSTRACT

Methods for determining a yaw angle and a pitch angle cycle for a wind turbine are disclosed. The methods comprise measuring during a measuring time a wind speed and a wind direction at a plurality of measuring heights between the maximum and minimum height at the wind site, determining an average wind speed and an average wind direction for each of the measuring heights during the measuring time, and determining a wind speed distribution and wind direction distribution between the maximum height and the minimum height, and determining one or more yaw-pitch combinations of yaw angle and pitch angle cycles as a function of an azimuth position of a rotor blade that lead to a desired angle of attack along the rotor swept area. The present disclosure further relates to methods of operating a wind turbine and suitable wind turbines.

20 Claims, 10 Drawing Sheets

(56) References Cited

U.S. PATENT DOCUMENTS

| | | | |
|---|---|---|---|
| 7,952,215 B2* | 5/2011 | Hayashi | F03D 7/0204 290/44 |
| 8,022,566 B2* | 9/2011 | Loh | F03D 7/0224 290/44 |
| 8,026,623 B2* | 9/2011 | Wakasa | F03D 7/0224 290/44 |
| 8,115,331 B2* | 2/2012 | Wakasa | F03D 7/0224 290/44 |
| 8,169,099 B2* | 5/2012 | Roznitsky | F03D 1/001 290/44 |
| 8,299,643 B2* | 10/2012 | Wakasa | F03D 7/0224 290/44 |
| 8,395,273 B2* | 3/2013 | Wakasa | F03D 7/0224 290/44 |
| 8,529,206 B2* | 9/2013 | Numajiri | F03D 7/0204 290/55 |
| 8,546,968 B2* | 10/2013 | Wakasa | F03D 7/0224 290/44 |
| 8,680,700 B2* | 3/2014 | Gomez De Las Heras Carbonell | F03D 7/0224 290/44 |
| 8,803,349 B2* | 8/2014 | Rebsdorf | F03D 7/0228 290/44 |
| 8,880,379 B2* | 11/2014 | Miranda | F03D 7/0224 290/44 |
| 8,901,763 B2* | 12/2014 | Bowyer | F03D 7/0204 290/44 |
| 8,987,929 B2* | 3/2015 | Jayant | F03D 7/0204 290/44 |
| 2006/0070435 A1* | 4/2006 | LeMieux | F03D 11/00 73/168 |
| 2008/0084068 A1* | 4/2008 | Shibata | F03D 1/025 290/44 |
| 2008/0150292 A1* | 6/2008 | Fedor | F03D 1/04 290/55 |
| 2008/0298963 A1* | 12/2008 | Egedal | F03D 7/0224 416/31 |
| 2010/0054939 A1* | 3/2010 | Hoffmann | F03D 7/0204 416/10 |
| 2010/0301607 A1* | 12/2010 | Morimoto | F03D 1/0658 290/44 |
| 2011/0140420 A1* | 6/2011 | Loh | F03D 7/0224 290/44 |
| 2011/0148115 A1* | 6/2011 | Roznitsky | F03D 1/001 290/44 |
| 2012/0104757 A1* | 5/2012 | De Las Heras Carbonell | F03D 7/0224 290/44 |
| 2012/0112458 A1* | 5/2012 | Numajiri | F03D 7/0204 290/44 |
| 2012/0261925 A1* | 10/2012 | Merlini, III | F03D 1/04 290/55 |
| 2013/0175804 A1* | 7/2013 | Cironi | F03D 1/04 290/55 |
| 2015/0308406 A1* | 10/2015 | Li | F03D 7/00 290/44 |

* cited by examiner

YAW AND PITCH ANGLES

The present application claims the benefit of U.S. provisional patent application 61/972,869 filed on Mar. 31, 2014, the entire contents of which are hereby incorporated by reference for all purposes.

The present disclosure relates to methods for determining a yaw angle and pitch angle cycle for a wind turbine, methods of operating a wind turbine, and wind turbines suitable for such methods.

BACKGROUND

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft drives the generator rotor either directly ("directly driven") or through the use of a gearbox.

A variable speed wind turbine may typically be controlled by varying the generator torque and the pitch angle of the blades. As a result, aerodynamic torque, rotor speed and electrical power generated will vary.

A common prior art control strategy of a variable speed wind turbine may be described with reference to FIG. 1a. In FIG. 1a, the operation of a typical variable speed wind turbine is illustrated in terms of the pitch angle (β), the electrical power generated (P), the generator torque (M) and the rotational velocity of the rotor (ω), as a function of the wind speed.

In a first operational range, from the cut-in wind speed to a first wind speed (e.g. approximately 5 or 6 m/s), the rotor may be controlled to rotate at a substantially constant speed that is just high enough to be able to accurately control it. The cut-in wind speed may be e.g. approximately 3 m/s.

In a second operational range, from the first wind speed (e.g. approximately 5 or 6 m/s) to a second wind speed (e.g. approximately 8.5 m/s), the objective may generally be to maximize power output while maintaining the pitch angle of the blades so as to capture maximum energy. In general, in the second operational range, the pitch angle of the blades may be substantially constant, although the optimal blade setting may theoretically depend on the instantaneous wind speed. In order to achieve this objective, the generator torque and rotor speed may be varied so as to keep the tip speed ratio λ (tangential velocity of the tip of the rotor blades divided by the prevailing wind speed) constant so as to maximize the power coefficient $C_p$.

In order to maximize power output and keep $C_p$ constant at its maximum value, the rotor torque may be set in accordance with the following equation:

$$T = k \cdot \omega^2,$$

wherein k is a constant, and ω is the rotational speed of the generator. In a direct drive wind turbine, the generator speed substantially equals the rotor speed. In a wind turbine comprising a gearbox, normally, a substantially constant ratio exists between the rotor speed and the generator speed.

In a third operational range, which starts at reaching nominal rotor rotational speed and extends until reaching nominal power, the rotor speed may be kept constant, and the generator torque may be varied to such effect. In terms of wind speeds, this third operational range extends substantially from the second wind speed to the nominal wind speed e.g. from approximately 8.5 m/s to approximately 11 m/s.

In a fourth operational range, which in some cases may extend from the nominal wind speed to the cut-out wind speed (for example from approximately 11 m/s to 25 m/s), the blades may be rotated ("pitched") to maintain the aerodynamic torque delivered by the rotor substantially constant. In practice, the pitch may be actuated such as to maintain the rotor speed substantially constant. At the cut-out wind speed, the wind turbine's operation is interrupted.

In the first, second and third operational ranges, i.e. at wind speeds below the nominal wind speed (the sub-nominal zone of operation), the blades are normally kept in a constant pitch position, namely the "below rated pitch position". Said default pitch position may generally be close to a 0° pitch angle. The exact pitch angle in "below rated" conditions however depends on the complete design of the wind turbine.

The before described operation may be translated into a so-called power curve, such as the one shown in FIG. 1a. Such a power curve may reflect the optimum operation of the wind turbine under steady-state conditions and under conditions of uniform wind speed over the rotor swept area (the area swept by the blades of the wind turbine).

If the wind is not uniform over the swept area and/or if the wind is variable, a steady state power such as the one depicted in FIG. 1a (and its accompanying control strategy) does not necessarily lead to optimum operation of the wind turbine.

A first possible non-uniformity over the rotor plane is the phenomenon of wind shear. With reference to FIG. 1b, the phenomenon of wind shear may be explained. Wind shear is a variation of wind speed with height. A wind turbine comprising a tower 5 carrying a rotor with blades 1, 2 and a third non-visible blade is illustrated in FIG. 1b. The tower 5 has height h. At height h, the wind speed is Vh. This wind speed may be measured e.g. by an anemometer based on the nacelle.

This however does not mean that the wind speed is constant over the entire rotor swept area. The wind speed may vary in accordance with wind profile 52. In particular, at increased heights, the wind speed may be higher, such as indicated in FIG. 1b, and the wind speed may be lower at heights below the nacelle. The resulting wind speed, i.e. the wind speed that would be more representative for the wind energy as perceived by the whole of the rotor may be e.g. the wind speed indicated by reference sign 51.

Although in this example a "classic" example of wind shear has been illustrated with a wind speed increasing with height, this does not necessarily need to be the case for all wind turbine sites. Depending on the site, e.g. phenomena of "low level jets" may be experienced. Low level jets may lead to the situation that e.g. at hub height the wind speed is significantly higher than at the top of the rotor swept area.

Also in the case of wind veer, the phenomenon of varying wind direction with height may lead to suboptimum results based on a fixed power curve to steady state conditions (illustrated in FIG. 1c).

It is known e.g. from EP 2 607 689 to use a LIDAR system to measure wind speeds in a plane upstream from a rotor plane of the wind turbine. According to EP 2 607 289 a control system for individually pitching the blades relative to the hub is provided. The rotor plane is divided into a plurality of predefined sections, wherein each section has an associated pitch reference value. A LIDAR may be used to determine expected properties of wind in each respective section of the rotor plane so that the pitch reference value may be adjusted accordingly.

One disadvantage related to such prior art systems is firstly that a rather expensive LIDAR system is needed for every wind turbine. Another disadvantage is that a quick forward feed control system and quick actuation system needs to be employed to take advantage of the information provided by the LIDAR. Constantly pitching the blades to adapt to gusts, wind shear, wind veer, turbulence and other phenomena for individual sections of the rotor swept area may lead to excessive wear on the pitch system.

The present disclosure relates to various methods and systems for avoiding or at least partly reducing one or more of the aforementioned problems.

SUMMARY

In a first aspect, a method of determining a yaw angle and a pitch angle cycle for a wind turbine located at a wind site is provided. The wind turbine has a support structure, a nacelle rotatably mounted upon the support structure, a generator and a system for varying a torque of the generator, a rotor that is operationally connected with the generator and having a plurality of blades defining a rotor swept area between a maximum height and a minimum height. The wind turbine further includes a pitch mechanism for each of the blades for rotating the blades around their longitudinal axes and determine pitch angles for the blades and having a maximum pitch speed. The wind turbine further includes a yaw system for rotating the nacelle around a longitudinal axis of the tower.

The method comprises measuring during a measuring time a wind speed and a wind direction at a plurality of measuring heights between the maximum and minimum height at the wind site, and determining an average wind speed and an average wind direction for each of the measuring heights during the measuring time. Based on the average wind speed and average wind direction for each of the measuring heights, a wind speed distribution and wind direction distribution between the maximum height and the minimum height is determined by assuming a wind speed distribution and wind direction distribution between the measured heights.

Then a desired angle of attack cycle as a function of an azimuth position of a rotor blade along the rotor swept area can be determined for a representative portion of the blade based on the wind speed distribution. A yaw angle can be determined taking into account the desired angle of attack cycle, the maximum pitch speed and the wind direction distribution. A maximum pitch speed may be regarded as the maximum speed (e.g. in degrees/second) that a blade can be rotated. The maximum speed inter alia depends on the pitch actuators (e.g. hydraulic pitch actuators, or electric motor with pinion and annular gear). A pitch angle cycle can then be determined based on the desired angle of attack cycle and the yaw angle.

The method according to this aspect is based on the fact that phenomena of wind veer, wind shear and low-level jets have a time constant of minutes, rather than seconds. By measuring average wind velocities and wind directions over a period of time and at different heights, an average wind distribution over the rotor swept area may be composed.

Both a yaw angle of a nacelle and a pitch angle of a blade directly influence the angle of attack of a blade as it rotates. Combinations of yaw angles and pitch angle cycles may be chosen to adapt to situations of wind veer and wind shear. Based on a determined wind distribution based on the measured averages at different heights, various combinations of yaw angles and pitch angle cycles may be determined that fulfil a condition of a desired angle of attack for a blade section as a blade rotates and covers the rotor swept area.

A yaw angle may be determined based on the wind direction distribution and the wind speed distribution and taking into account the desired angle of attack cycle and the maximum pitch speed. The yaw angle is thus not necessarily determined as a function of the wind direction at hub height, but rather takes the wind distribution over the rotor swept area into account. It may be for example that the wind speed is substantially higher in an upper part of the rotor swept area, and it may be advantageous to align the upper part of the rotor swept area with the prevailing wind direction at that height. At the same time, the maximum pitch speed may be taken into account in order to be able to fulfil a desired angle of attack cycle.

Once a yaw angle has been chosen, the pitch angle cycle may de determined that fulfils the desired angle of attack cycle.

The desired angle of attack cycle may be determined based on an optimization criterion. In some examples, the optimization criterion may be a minimization of loads or a maximization of energy yield. The optimization criterion may depend e.g. on whether a wind turbine is working in a supra-nominal zone of operation or in a sub-nominal zone of operation. In a supra-nominal zone of operation, an objective may be to reduce loads. In a sub-nominal zone of operation, an objective may be to maximize energy yield.

An aspect of these methods is that no wind measurement system such as e.g. a LIDAR is needed for every single wind turbine. For example, measurement system(s) may be provided on a single meteorological pole or a few meteorological poles. The data from these measurements, in particular the measured averages, may be used in the control of each of the wind turbines in a wind park.

Furthermore, no particular measurement technology needs to be implemented. Depending on the implementation, LIDAR and/or SODAR technology and/or anemometers and/or Ka-band radar may be used.

Another aspect of this method is that yaw angle control and pitch angle control are integrated, i.e. the effect of one on the other is taken into account. A further aspect is that this control may be surperimposed or combined with another control at individual wind turbine level.

In some examples, the desired angle of attack cycle, the yaw angle, and the pitch angle may be determined online, i.e. during operation, using some algorithm or transfer function. In other examples, a plurality of wind conditions may be simulated offline. During these simulations, desired angle of attack cycles and corresponding yaw angles and pitch cycles may be determined. Then during operation, it may be determined to which of the simulated conditions, the actual conditions correspond best. Then the corresponding yaw angle and pitch angle cycles may be implemented. Alternatively, some form of interpolation between simulated conditions, and corresponding yaw angles and pitch angle cycles may be implemented. The simulated conditions and corresponding yaw angles and pitch angle cycles and/or desired angle of attack cycles may be stored in the form of a look-up table.

In some examples, the plurality of heights comprises at least three heights. Inventors have found that using three different heights can give reliable information on phenomena such as wind veer and wind shear over a rotor swept area. In particular blade sections at about two thirds of the blade length have an important impact on the aerodynamic torque of a rotor. This is due to the particular combination of distance to a rotational axis and chord length of the blade in situ. In general, chord length diminishes from a root portion to a tip portion of a blade. Also aerodynamic profiles of the blades change over the length of the blade. At the root the blade is more optimized for structural performance, whereas towards the tip, the blade is optimized for aerodynamic performance. It has been found that blade portions at or near about two thirds of the blade length (i.e. one third of a blade length away from the tip) contribute significantly to the aerodynamic torque. Depending on the site, and depending on the wind turbine, it may thus be particularly beneficial that reliable information is available for this portion of the blade. In one example, measuring heights may thus comprise a height of a hub of the wind turbine and optionally comprises a height corresponding to the height of the hub minus two thirds of a length of the blades, and a height corresponding to the height of the hub plus two thirds of the length of the blades.

In some examples, assuming a wind speed distribution and wind direction distribution may comprise a linear interpolation of the average wind speed and the average wind direction between each of the measuring heights and/or a linear extrapolation of the average wind speed and average wind direction below a minimum measuring height and above a maximum measuring height. Linear interpolation and/or extrapolation is a particularly simplified way of determining a wind speed and wind direction distribution in a reliable manner.

In another aspect, the present disclosure provides a method of operating a wind turbine as a function of wind speed which comprises a method of determining a yaw angle and a pitch angle cycle according to any of the examples disclosed herein and determining a uniform pitch angle and a uniform generator torque for a theoretically uniform wind distribution. The method further comprises determining an instantaneous azimuth position for each of the blades, and determining an instantaneous pitch angle for each of the blades by summing the uniform pitch angle with a pitch angle corresponding to the instantaneous azimuth position according to the selected pitch angle cycle. Then, the method comprises rotating the blades according to the instantaneous pitch angles for each of the blades, rotating the nacelle according to the selected yaw angle, and applying the uniform generator torque.

According to this aspect, examples of the methods for determining yaw angle-pitch angle cycle combinations may be combined or superimposed on an individual control strategy. An individual control strategy may be e.g. a standard variable speed wind turbine strategy assuming a uniform wind distribution as commented in the introduction of this disclosure. In another example, the individual control strategy may take into account effects of individual pitch. Regardless of the individual control strategy at a wind turbine level, the information of wind averages and the integrated control of yaw angle and pitch angles may be used advantageously. The effects of low level jets, wind shear and wind veer are not effects that disappear within a few seconds. This means that even though the exact wind speed for a given height may vary to an important degree within a few seconds, wind shear and wind veer effects may be assumed to be substantially constant.

Wind turbine operation and control may thus be affected by a momentary change in wind speed, (e.g. a pitch angle may be changed) but a pitch angle variation during one rotation may be maintained substantially the same. In a specific example, in an imaginary situation of wind shear, a pitch angle cycle may be sinusoidal and may vary between 5° and 12°. When the wind speed reduces, the pitch angle cycle may still be sinusoidal by may vary between 1° and 8°. The control thus still takes the variation of wind speed over the rotor swept area into account because these are longer term effects.

In another aspect, a wind turbine is provided comprising a support structure (e.g. a tower), a nacelle rotatably mounted upon the support structure, a generator and a system for varying a torque of the generator, and a rotor with a plurality of blades defining a rotor swept area between a maximum height and a minimum height, and the rotor being operationally connected with the generator. The wind turbine further comprises a pitch mechanism for each of the blades for rotating the blades around their longitudinal axes and determine pitch angles for the blades, a yaw system for rotating the nacelle around a longitudinal axis of the tower, a wind speed measurement system for directly or indirectly measuring a representative wind speed, and an azimuth measurement system for determining an azimuth angle for each of the rotor blades.

The wind turbine furthermore comprises a local wind turbine control system which is configured to receive a yaw angle and a pitch angle cycle, to receive the representative wind speed from the wind speed measurement system, to receive the azimuth angles for each of the rotor blades. The local wind turbine control system is further configured to determine a uniform pitch angle and a uniform generator torque for the representative wind speed, to determine an instantaneous pitch angle for each of the blades by summing the uniform pitch angle with a pitch angle corresponding to the instantaneous azimuth position according to the selected pitch angle cycle, and to send control signals to the yaw system, the pitch mechanisms and the system for varying the torque of the generator. In response to these control signals, the blades are rotated according to the instantaneous pitch angles for each of the blades, the nacelle is rotated according to the selected yaw angle, and the uniform generator torque is applied to the generator.

In accordance with this aspect, a wind turbine is provided that is configured to combine a control at individual wind turbine level with the information provided e.g. at a central level of effects of wind shear and/or wind veer and/or e.g. low level jets.

BRIEF DESCRIPTION OF THE DRAWINGS

Non-limiting examples of the present disclosure will be described in the following, with reference to the appended drawings, in which.

DETAILED DESCRIPTION

Figure 1A:
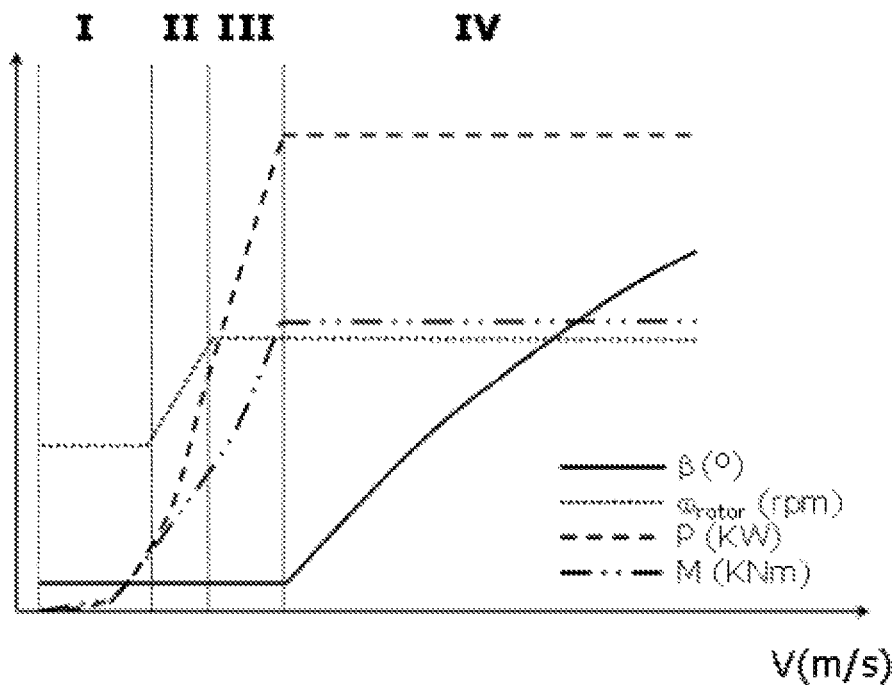
FIG. 1a illustrates a typical power curve of a wind turbine.
Figure 1B:
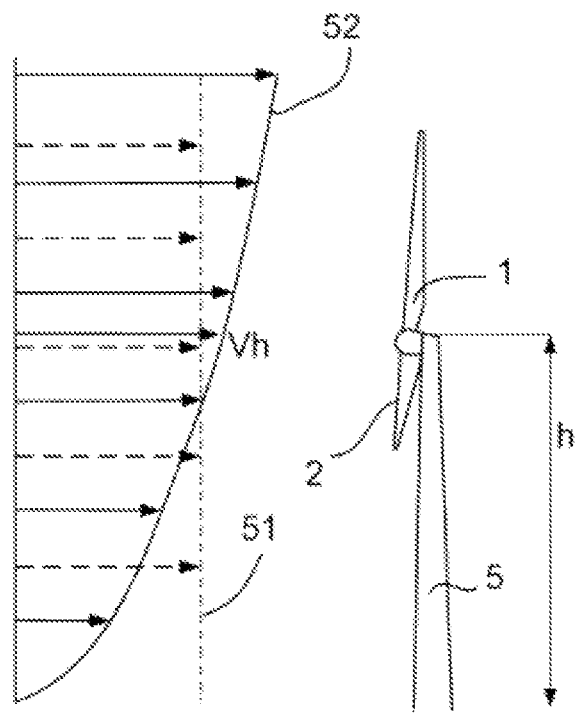
FIG. 1b schematically illustrates the phenomenon of wind shear.
Figure 1C:
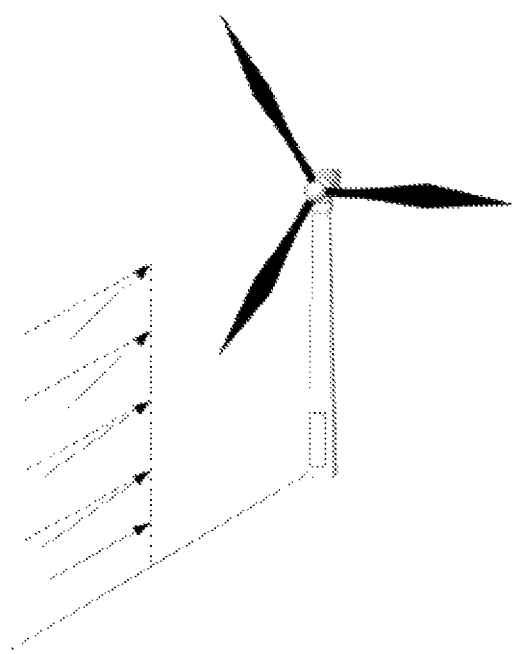
FIG. 1c schematically illustrates the phenomenon of wind veer.

The power curve of FIG. 1 has been discussed before.

Figure 2A:
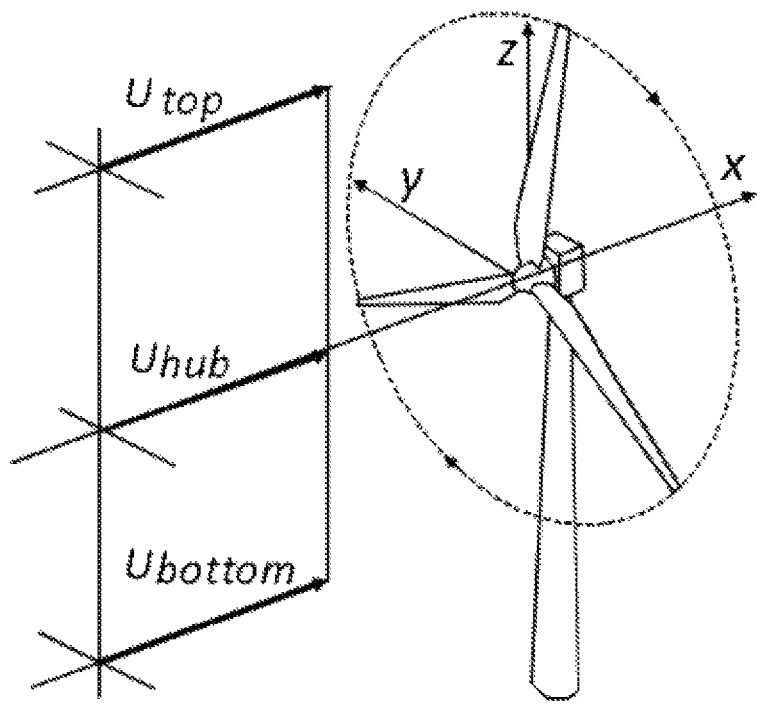
FIGS. 2a-2c schematically illustrate the determination of an angle of attack for a wind turbine blade section at different portions of a rotor swept area in case of a uniform wind field.
Figure 2B:
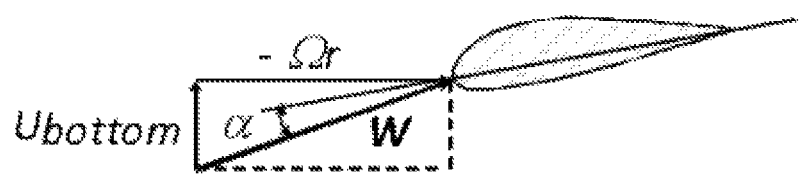
Figure 2C:
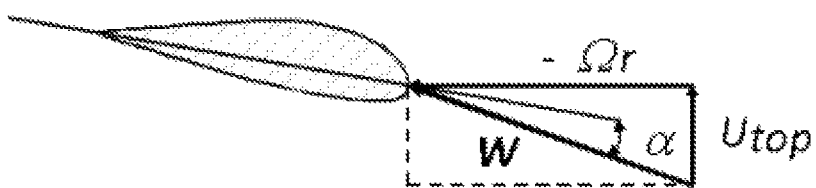

FIGS. 2*a*-2*c* schematically illustrate the determination of an angle of attack for a wind turbine blade section at different portions of a rotor swept area in case of a uniform wind field.

FIG. 2*a* illustrates a uniform wind field. FIG. 2*b* illustrates for a rotor blade section at a bottom of the rotor swept area (i.e. a rotor blade is substantially vertical and pointing downwards), that the effective wind speed experienced by a blade section is a combination of a tangent speed of the blade section $V_t = -\Omega.r$ and the axial free stream wind speed $U_{bottom}$. The angle of attack may be defined as the angle between a chord line of the aerodynamic profile of the rotor blade section and the effective wind speed. Because the effective wind speed depends on the tangent speed of the rotor blade section, it may thus be derived directly that the angle of attack depends not only on the rotational speed of the rotor, but also on the radius, i.e. the distance of the blade section to the rotor's rotational axis. For ease of understanding, a local twist angle of a rotor blade section is herein disregarded.

FIG. 2*c* illustrates the same for a rotor blade section at the top of the rotor swept area (i.e. a rotor blade is substantially vertical and pointing upwards). Because the wind field is uniform over the rotor swept area, both in terms of direction and speed, the resulting angle of attack for the same rotor blade section is the same at the top as at the bottom of the rotor swept area.

Figure 3A:
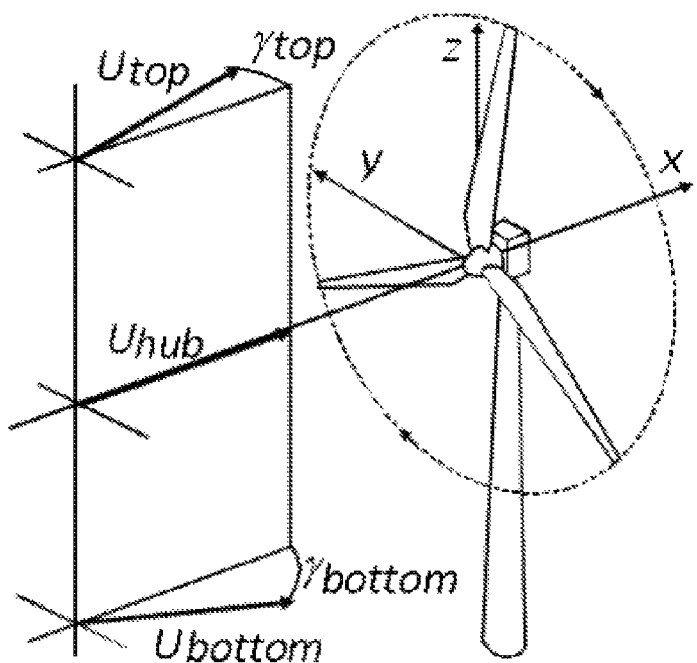
FIGS. 3a-3c schematically illustrate the phenomenon of wind veer and its influence on the angle of attack of a wind turbine blade section in different portions of a rotor swept area.
Figure 3B:
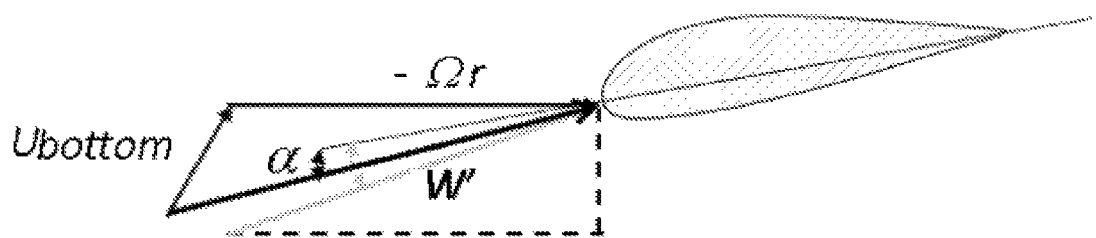

FIG. 3*a* schematically illustrates the phenomenon of wind veer. It may be seen that the wind direction varies from the bottom to the top. FIG. 3*b* illustrates the influence of the wind veer on the angle of attack of a wind turbine blade section at the bottom of the rotor swept area. Again, the effective wind speed w' is a combination of the tangential speed of the rotor blade section $(-\Omega.r)$ and of the axial free stream wind speed, which in this case is rotated with respect to the situation of FIG. 2*b*. The situation when a uniform wind field is considered is also shown in light grey for comparative purposes.

Figure 3C:
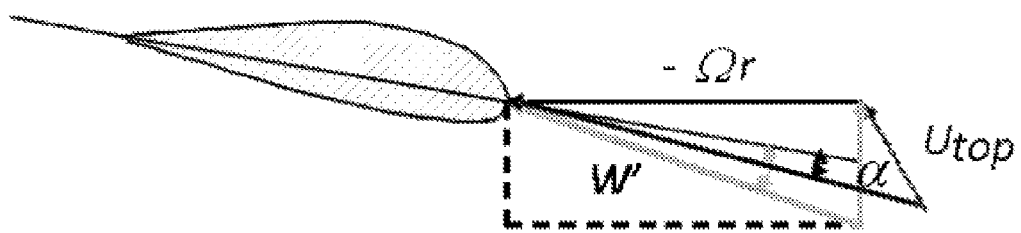

FIG. 3*c* illustrates the situation for a rotor blade section at the top of the rotor swept area. Because of the specific case of wind veer (i.e. a variation of wind direction at the top is of the same magnitude but of opposite sign as the variation at the bottom), the resulting angle of attack at the top corresponds to the angle of attack at the bottom. It should be clear however that in a different example of wind veer, this may not be the case.

Figure 4A:
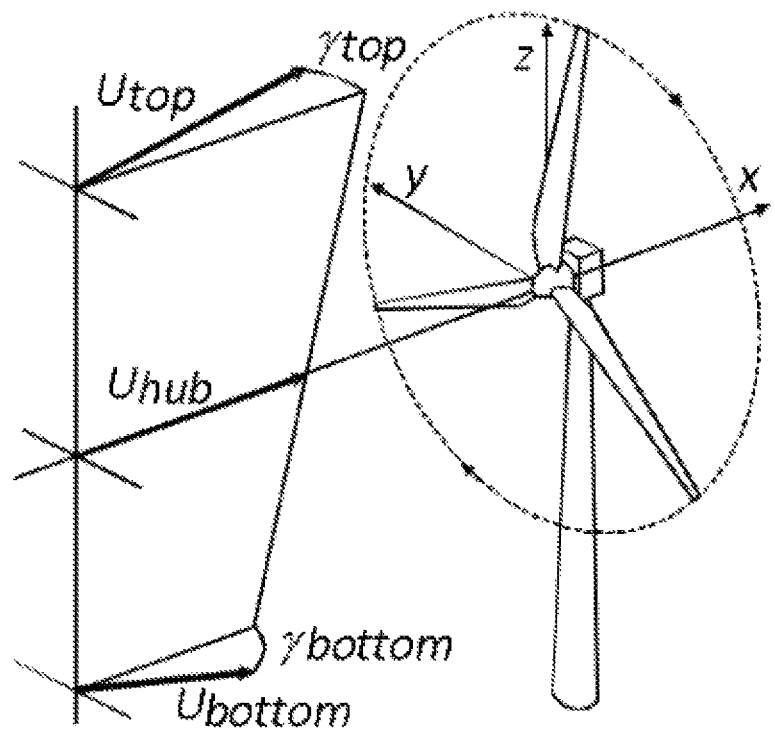
FIGS. 4a-4c schematically illustrate the combination of wind veer and wind shear and its influence on the angle of attack of a wind turbine blade section in different portions of a rotor swept area.
Figure 4B:
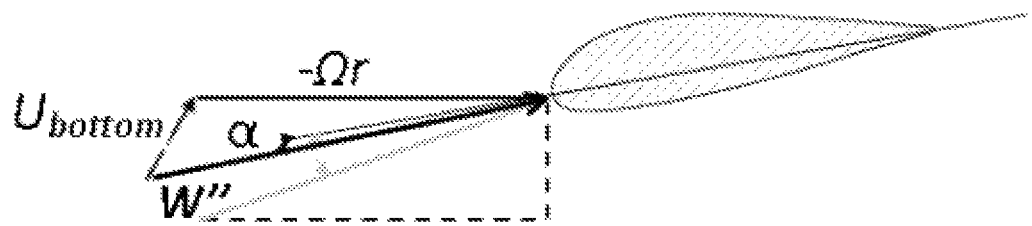
Figure 4C:
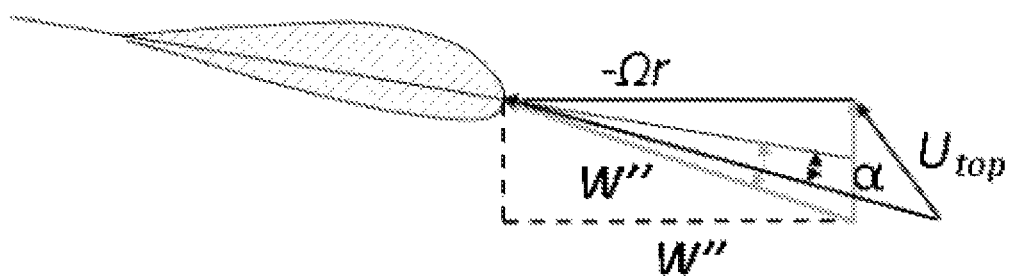

FIG. 4*a* schematically illustrates a combination of wind veer and wind shear. FIGS. 4*b* and 4*c* illustrate how the effective wind speed and angle of attack differ for a rotor blade section at the bottom (FIG. 4*b*) and at the top (FIG. 4*c*) of the rotor swept area. Because of the added effect of wind shear, the angles of attack do not correspond anymore at the bottom and at the top.

Figure 5A:
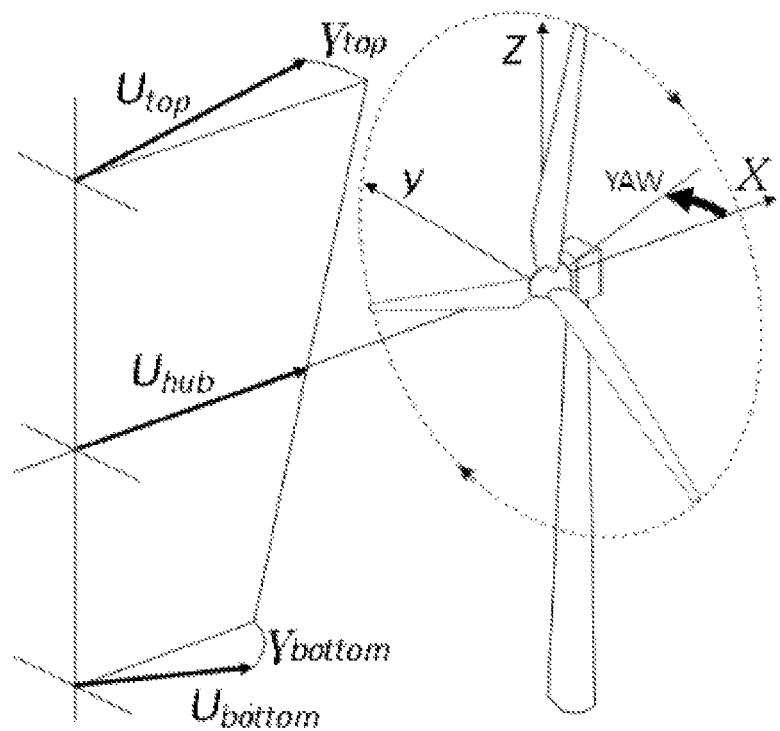
FIGS. 5a-5c schematically illustrate the combination of wind veer, wind shear and a yaw angle and its influence on the angle of attack of a wind turbine blade section in different portions of a rotor swept area.
Figure 5B:
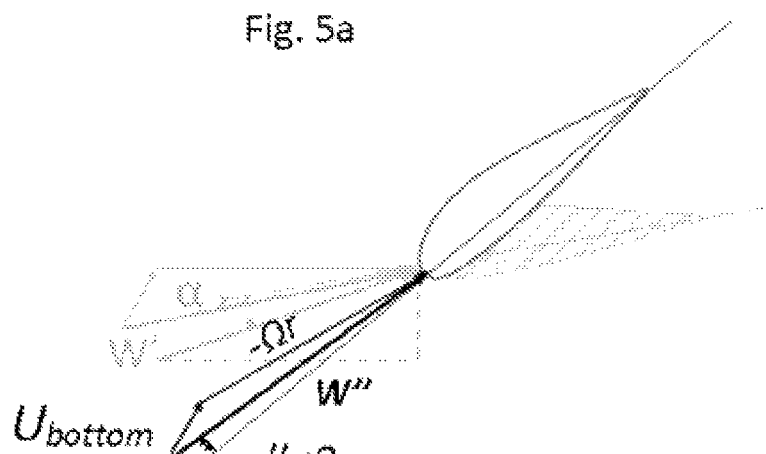

FIG. 5*a* schematically illustrates the same combination of wind veer, wind shear and the influence of a yaw angle of the nacelle on the angle of attack. FIG. 5*b* schematically illustrates the effect on the angle of attack at the bottom of the rotor swept area. The rotor plane has rotated with respect to the previously illustrated example and thus the tangential speed of the rotor blade section $(-\Omega.r)$ has rotated. The effect, when comparing to FIG. 4*b* is that the angle of attack has decreased and has actually become negative.

Figure 5C:
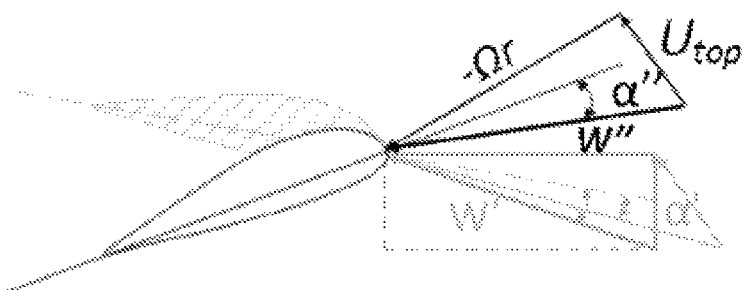

FIG. 5*c* schematically illustrates the effect on the angle of attach at the top of the rotor swept area. The tangential speed of the rotor blade has effectively been rotated in an opposite direction. The effect, when comparing to FIG. 4*c* is that the angle of attack has actually increased and become more positive.

Although this has not been illustrated for other sections of the rotor swept area, the tangential speed of the rotor blade is rotated differently for each section of the rotor swept area.

Figure 6A:
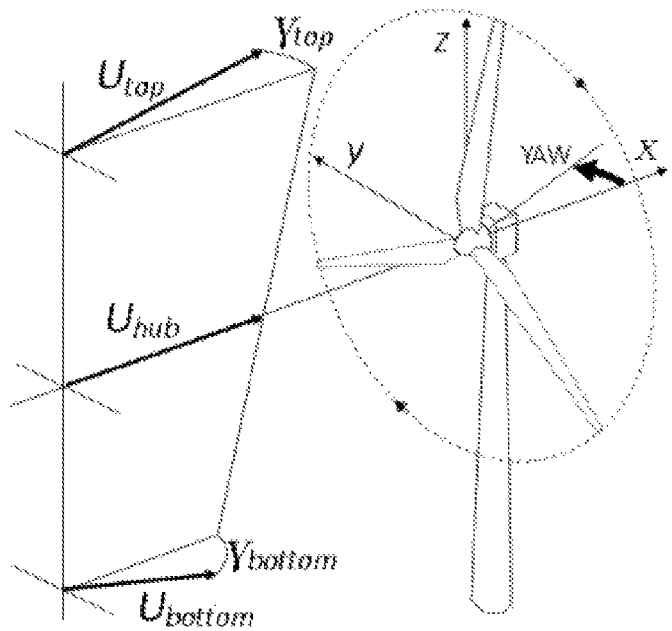
FIGS. 6a-6d schematically illustrate the combinations of wind veer, wind shear, yaw angle and a pitch angle cycle and the resulting influence on the angle of attack of a wind turbine blade section in different portions of a rotor swept area.
Figure 6B:
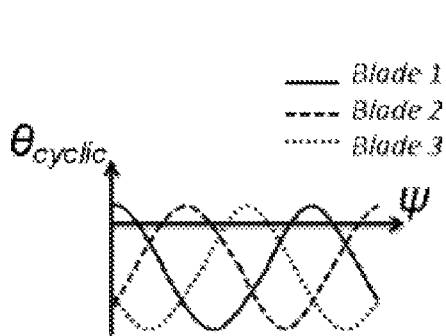
Figure 6C:
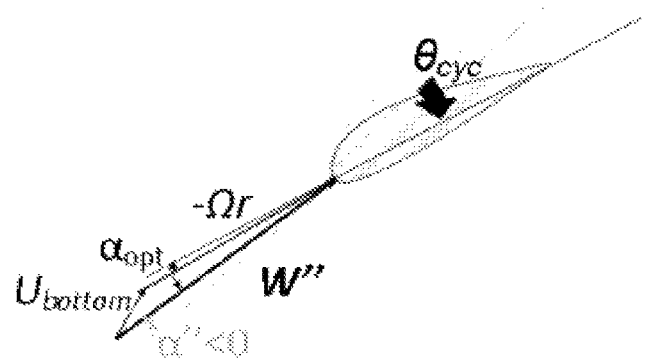

FIGS. 6*a* and 6*b* schematically illustrate the combinations of wind veer, wind shear, yaw angle and a pitch angle cycle. FIG. 6*c* illustrates the effect of the pitch cycle on the rotor blade section at the bottom of the rotor swept area. The effect of changing the angle of pitch throughout a revolution is that the blade is rotated with respect to the rotor plane, and importantly that the rotation with respect to the rotor plane varies throughout one revolution. It can thus be achieved that the rotor blade section has the desired angle of attack by a suitable combination of a yaw angle and a pitch angle cycle. The yaw angle has a varying effect on the angle of attack throughout a rotation, and this varying effect can be compensated with a suitable pitch angle.

Figure 6D:
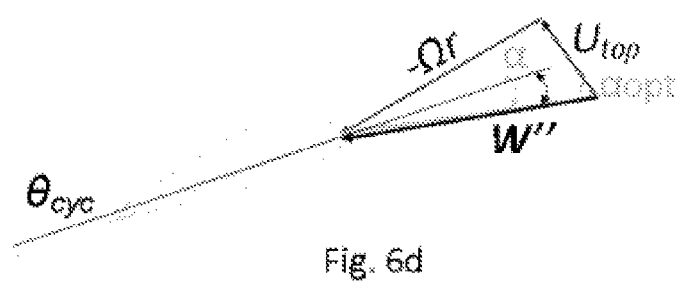

FIG. 6*d* shows that for the rotor blade section at the top of the rotor swept area, the angle of attack is the same as for the bottom of the rotor swept area. In principle, different combinations of yaw angles and pitch angle cycles are available for which an angle of attack is substantially constant for a rotor blade section.

In fact, for a given angle of attack, various combinations of yaw angle and pitch angle cycles are available. For a given yaw angle, more or less pitching may be required. In order to be able to reach a desired angle of attack, a maximum pitch speed should be taken into account.

In the particular case illustrated here, a linear variation from the bottom to the top for both wind veer and wind shear is assumed, but it will be clear that in practice more complicated scenarios may arise.

Figure 7:
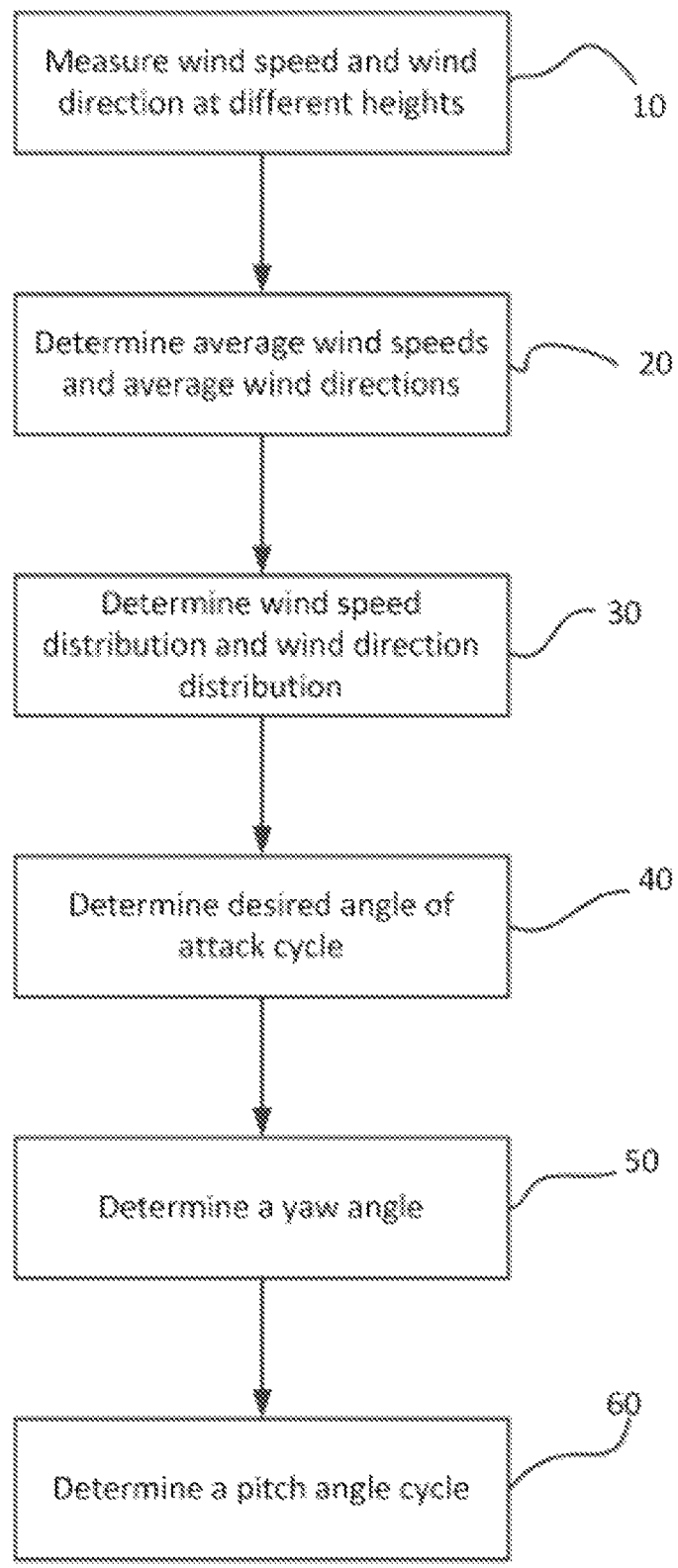
FIG. 7 schematically illustrates an example of a method of determining a yaw angle and a pitch angle cycle for a wind turbine.

FIG. 7 schematically illustrates an example of a method of determining a yaw angle and a pitch angle cycle for a wind turbine. At block 10, wind speed and wind direction may be measured at a plurality of heights during a measuring time. In an example, three or more heights may be chosen for measuring wind speed and direction. In a particular example, wind speed and wind direction may be measured in the lower half of the rotor swept area, substantially at hub height and in the upper half of the rotor swept area.

In a more particular example, the plurality of heights may comprise a height of a hub of the wind turbine and optionally comprises a height corresponding to the height of the hub minus two thirds of a length of the blades, and a height corresponding to the height of the hub plus two thirds of the length of the blades. These heights may be chosen due to the peculiar weight that may be given to the rotor blade section corresponding to approximately two thirds of the blade length in the generation of aerodynamic torque.

At block 20, average wind speeds and average wind directions may be determined. At block 30, a wind speed distribution and wind direction distribution between a minimum height of the rotor swept area and a maximum height of the rotor swept area may be determined. For example, linear interpolation and/or linear extrapolation may be used to determine such a wind distribution. In other examples, other interpolation and/or extrapolation algorithms could be used.

The determined wind speed (and optionally wind direction distribution) may be used to derive a desired angle of attack cycle at block 40. The desired angle of attack may depend on the instantaneous operational conditions. An objective of reducing loads, maximizing energy or some intermediate may be defined depending on the operational conditions.

At block 50, a suitable yaw angle may be determined and at block 60, a pitch angle cycle may be determined that substantially satisfies desired angle of attack cycle based on the selected yaw angle, and the wind speed and wind direction distribution.

The optimum angle of attack may depend on the current wind regime. If the prevailing wind speed is above a nominal wind speed, the optimum angle of attack may be chosen so as to substantially minimize a cyclic variation of loads, while maintaining at rated electrical power. In one example, the variation of out-of-plane loads may be substantially reduced by choosing an angle of attack cycle throughout a rotation that leads to substantially constant thrust. Since the wind speed may vary throughout a rotation, the angle of attack corresponding to maintaining a substantially constant thrust may vary as well. Reducing the variation of thrust, also leads to a reduction of bending loads/moments at the bottom of the tower. Such a reduction in the variation of out-of-plane loads and/or tower loads may reduce the fatigue damage.

If on the other hand, the prevailing wind speed is below a nominal wind speed, an optimum angle of attack may be determined by maximizing the energy yield, i.e. the production of electrical power. If the wind speed varies mainly within the "second operation range", i.e. the range below nominal wind speed in which the wind turbine may operate under maximum power coefficient, $C_{pmax}$, then the desired angle of attack may be substantially constant throughout the rotation of a blade.

In yet a further example, if the wind speed varies between the second and third operational range, the desired angle of attack may be chosen so as to optimize energy yield, by maximizing aerodynamic torque.

In yet a further example, wind speeds may vary over the rotor swept area between wind speeds below the nominal wind speed and above the nominal wind speed. In such a situation, a trade-off may be made between loads and energy yield.

Figure 8:
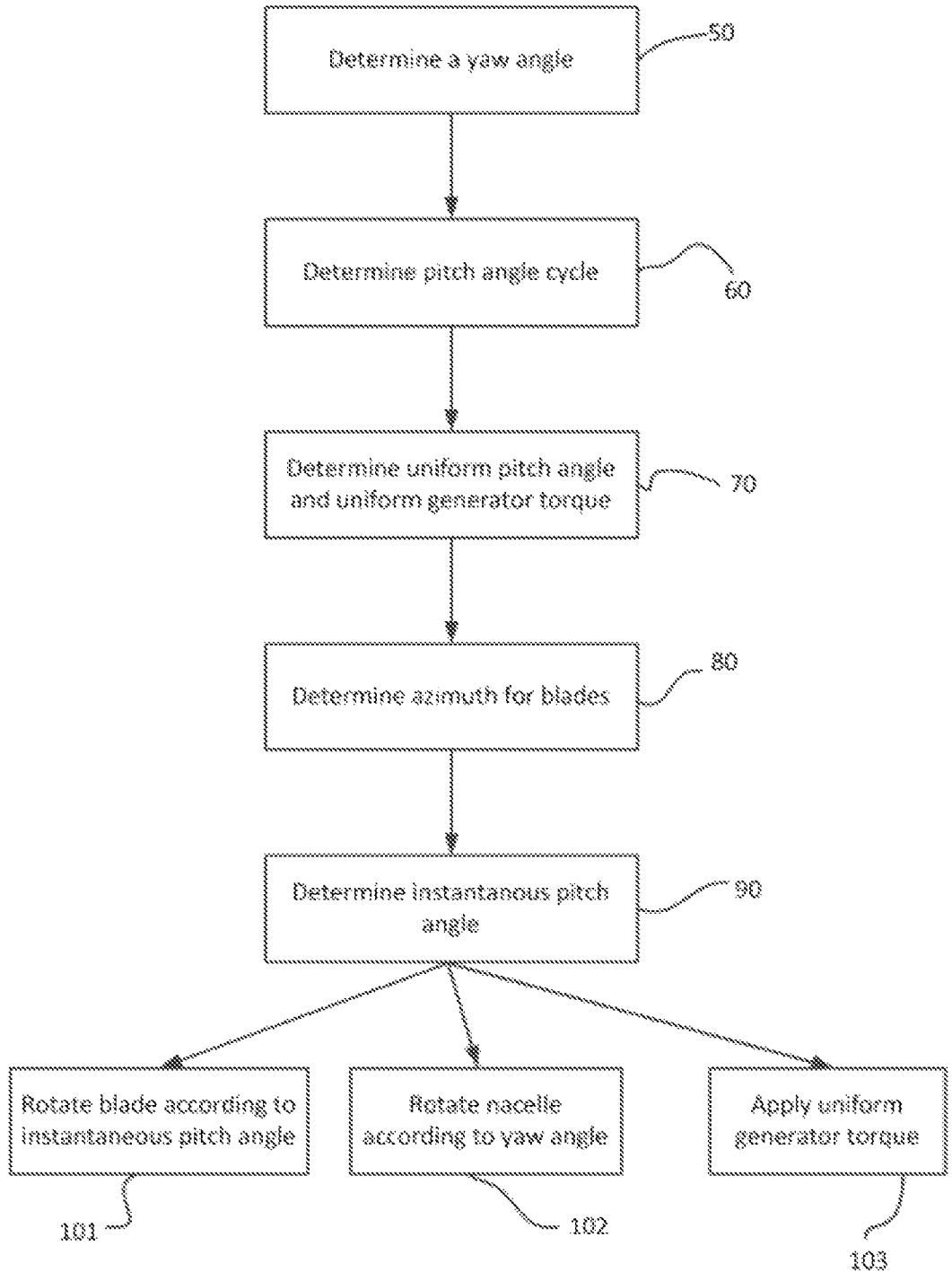
FIG. 8 schematically illustrates an example of a method of operating a wind turbine.

FIG. 8 schematically illustrates an example of a method of operating a wind turbine. In this example, a method of operating a wind turbine that is based on a uniform wind speed may be combined with a method for determining yaw angle and pitch angle cycle that takes into account non-uniformities.

At block 50, a suitable yaw angle and at block 60, a suitable pitch angle cycle that in combination give a desired angle of attack cycle over a rotor swept area may be determined in accordance with any of the examples described herein. Such combinations may be determined e.g. every minute, or every three-five minutes or every 10 minutes. The frequency of this determination depends on the measuring time for the average wind speeds and wind directions.

At block 70, a pitch angle and a generator torque may be determined in accordance with a control strategy that assumes a uniform wind speed and direction over the rotor swept area. In an example, the control strategy may include following a power curve describing an operation of the wind turbine as a function of a wind speed. A classic variable speed control for a wind turbine may be implemented.

The power curve may comprise a sub-nominal zone of operation for wind speeds below a nominal wind speed and a supra-nominal zone of operation for wind speeds above the nominal wind speed. In the sub-nominal zone of operation, the uniform blade pitch angle may be substantially constant and in some cases may be substantially equal to zero. In the sub-nominal zone of operation, the uniform generator torque may be varied.

The sub-nominal zone of operation may comprise a first operational range, a second operational range and a third operational range, wherein the first operational range extends from a cut-in wind speed to a first wind speed, and wherein the rotor speed is kept substantially constant at a first value. The second operational range extends from the first wind speed to a second wind speed, wherein both the rotor speed and uniform generator torque are varied as a function of wind speed, and the third operational range extends from the second wind speed to the nominal wind speed, wherein the rotor speed is kept substantially constant at a second value.

The supra-nominal zone may comprise a fourth operational range in which an aerodynamic torque of the rotor is maintained substantially constant by varying the uniform pitch angle.

The uniform pitch angle and uniform generator torque may be determined with a much higher frequency than the yaw-pitch combination of block 50.

At block 80, the azimuth angle for each of the blades may be determined. The azimuth angle represents the position of a rotor blade within the rotor plane. An azimuth angle may be set equal to zero for a rotor blade that is substantially vertical and pointing upwards.

At block 90, based on the azimuth position of each of the blades, a pitch angle corresponding to the pitch angle cycle may be determined. By combining this pitch angle with the uniform pitch angle, the optimum angle of attack for the rotor blade at any azimuthal position may be given.

The uniform pitch angle may be used to determine the optimum angle of attack throughout the rotor swept area. This may then be achieved by a combination of yaw angle and pitch angle cycles determined at blocks 50 and 60.

At block 101, the pitch systems may be used to rotate each of the blades in accordance with the pitch angles determined for each of the blades. At block 102, the nacelle may be rotated in accordance with the yaw angle (or maintained in this position). And at block 103, the uniform generator torque may be applied to the generator. In combination, the wind turbine may effectively be controlled.

It will be clear that the order of the blocks of FIG. 8 is non-limiting.

Figure 9:
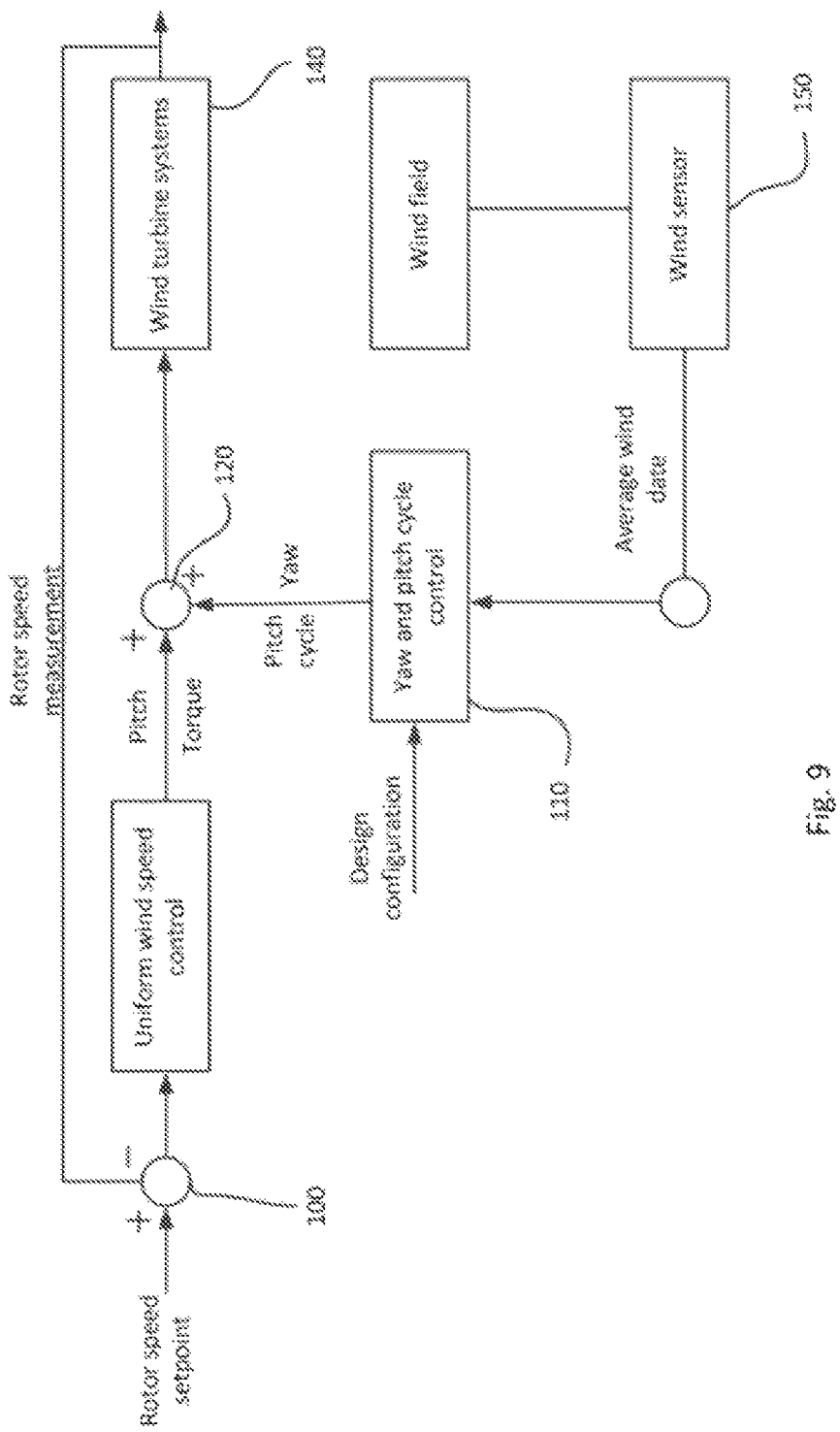
FIG. 9 schematically illustrates a control of a wind turbine.

FIG. 9 schematically illustrates a control of a wind turbine. A variable speed wind turbine may typically implement a control based on a wind speed. However, the actual control may not necessarily be based on measuring a wind speed, but rather on a measurement of the rotor speed. In particular, the generator rotor speed may be measured and may indicate directly the rotational speed of the rotor.

The instantaneous rotor speed may be compared with a rotor speed set-point (reference sign 100). An error value of a difference between the actual rotor speed and a rotor speed setpoint may be used as input in a PID control. Depending on the wind regime, a pitch angle and torque may be given assuming a uniform wind speed over the rotor swept area.

At block 110, a yaw and pitch angle combination may be determined based on the wind turbine configuration (e.g. rotor radius) and average wind data, i.e. wind data collected over a predetermined measuring time. The wind data may be collected by one or more wind sensors 150. In particular, wind data may be collected at a plurality of measuring heights. In some examples, combinations of yaw angle and pitch angle cycles may be based on offline simulations.

Different wind sensors could be used depending on the implementation. Examples include e.g. a plurality of anemometers mounted at different heights in a meteorological pole. Other examples include one or more LIDAR systems.

A suitable pitch angle may be determined by combining the yaw-pitch combination with the pitch angle that assumes a uniform wind field. Suitable commands of pitch, torque and yaw may thus be sent to wind turbine systems 140. A feedback mechanism includes measuring the rotor speed and comparing again the rotor speed with a rotor speed setpoint (at reference sign 100).

Combining the "uniform pitch angle" with the pitch angle cycle may involve simply adding up both pitch angles for the case that the average angle of attack in the yaw-pitch cycle combination is assumed to be zero throughout the rotor swept area. The desirable average angle of attack over the rotor swept area may thus be given by the uniform pitch angle. The resulting pitch angle may thus be the simple sum of the uniform pitch angle and the pitch angle according to the azimuthal position of the blade and according to the pitch angle cycle.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method of determining a yaw angle and a pitch angle cycle for a wind turbine located at a wind site, the wind turbine having
    a support structure,
    a nacelle rotatably mounted upon the support structure,
    a generator and a system for varying a torque of the generator,
    a rotor with a plurality of blades defining a rotor swept area between a maximum height and a minimum height, and operationally connected with the generator,
    a pitch mechanism for each of the blades for rotating the blades around their longitudinal axes, determining pitch angles for the blades and having a maximum pitch speed, and
    a yaw system for rotating the nacelle around a longitudinal axis of the tower,
    the method comprising:
        measuring during a measuring time a wind speed and a wind direction at a plurality of measuring heights between the maximum and minimum height at the wind site;
        determining an average wind speed and an average wind direction for each of the measuring heights during the measuring time;
        determining a wind speed distribution and wind direction distribution between the maximum height and the minimum height based on the average wind speed and average wind direction for each of the measuring heights and by assuming a wind speed distribution and wind direction distribution between the measured heights;
        determining a desired angle of attack cycle as a function of an azimuth position of a rotor blade along the rotor swept area for a representative portion of the blade based on the wind speed distribution;
        determining a yaw angle based on the wind direction distribution and taking into account the desired angle of attack cycle as a function of the azimuth position and the maximum pitch speed; and
        determining a pitch angle cycle as a function of the azimuth position of the rotor blade based on the desired angle of attack cycle and the determined yaw angle.

2. The method according to claim 1, wherein the desired angle of attack cycle, the yaw angle and the pitch angle cycle are determined online.

3. The method according to claim 1, wherein determining a desired angle of attack, a yaw angle and a pitch angle cycle are based on offline simulations.

4. The method according to claim 1, wherein the desired angle of attack cycle as a function of the azimuth position of the rotor blade along the rotor swept area for a representative portion of the blade is also based on the wind direction distribution.

5. The method according to claim 1, wherein determining the desired angle of attack cycle as a function of the azimuth position of the rotor blade along the rotor swept area comprises determining an angle of attack cycle that substantially maximizes energy yield.

6. The method according to claim 5, wherein the desired angle of attack cycle comprises maintaining the angle of attack substantially constant along the rotor swept area.

7. The method according to claim 1, wherein determining the desired angle of attack cycle as a function of the azimuth position of the rotor blade along the rotor swept area comprises determining an angle of attack that substantially minimizes a cyclic variation of loads over the rotor swept area.

8. The method according to claim 1, wherein the plurality of heights comprises at least three different heights.

9. The method according to claim 8, wherein the plurality of heights comprises a height of a hub of the wind turbine and further comprises a height corresponding to the height of the hub minus two thirds of a length of the blades, and a height corresponding to the height of the hub plus two thirds of the length of the blades.

10. The method according to claim 1, wherein measuring a wind speed and a wind direction at a plurality of measuring heights comprises measuring the wind speed and the wind direction using a LIDAR or anemometers.

11. The method according to claim 10, wherein the LIDAR and/or anemometers are positioned on a meteorological pole.

12. The method according to claim 10, wherein a measuring time for wind speed and wind direction is in a range from 1 minute up to and including 10 minutes.

13. The method according to claim 12, wherein the measuring time is in a range from 3 minutes up to and including 5 minutes.

14. The method according to claim 1, wherein the representative portion of each of the blades corresponds to the portion of each of the blades at approximately two thirds of the blade length.

15. The method according to claim 1, wherein assuming a wind speed distribution and wind direction distribution comprises representing the wind speed distribution and wind direction by a linear interpolation of the average wind speed and the average wind direction between each of the measuring heights.

16. The method according to claim 1, wherein assuming a wind speed distribution and wind direction distribution comprises representing the wind speed distribution and wind direction by a linear extrapolation of the average wind speed and average wind direction below a minimum measuring height and above a maximum measuring height.

17. A method of operating a wind turbine as a function of wind speed comprising:

the method of determining a yaw angle and a pitch angle cycle according to claim 1; and determining a uniform pitch angle and a uniform generator torque for a theoretically uniform wind distribution;

determining an instantaneous azimuth position for each of the blades;

determining an instantaneous pitch angle for each of the blades by combining the uniform pitch angle with a pitch angle corresponding to the instantaneous azimuth position according to the selected pitch angle cycle;

rotating the blades according to the instantaneous pitch angle for each of the blades;

rotating the nacelle according to the selected yaw angle; and applying the uniform generator torque.

18. The method of operating a wind turbine according to claim 17, wherein determining a uniform pitch angle and uniform generator torque for a theoretically uniform wind distribution comprises following a power curve describing an operation of the wind turbine as a function of wind speed;

the power curve comprising a sub-nominal zone of operation for wind speeds below a nominal wind speed and a supra-nominal zone of operation for wind speeds above the nominal wind speed, and wherein in the sub-nominal zone of operation, the uniform blade pitch angle is substantially equal to zero, and wherein the uniform generator torque is varied, the sub-nominal zone of operation comprises a first operational range, a second operational range and a third operational range, wherein the first operational range extends from a cut-in wind speed to a first wind speed, wherein the rotor speed is kept substantially constant at a first value, the second operational range extends from the first wind speed to a second wind speed, wherein both the rotor speed and uniform generator torque are varied as a function of wind speed, and the third operational range extends from the second wind speed to the nominal wind speed, wherein the rotor speed is kept substantially constant at a second value, and the supra-nominal zone comprises a fourth operational range in which an aerodynamic torque of the rotor is maintained substantially constant by varying the uniform pitch angle.

19. A method of determining a yaw angle and a pitch angle cycle for a wind turbine located at a wind site, the wind turbine having a support structure, a nacelle rotatably mounted upon the support structure, a generator and a system for varying a torque of the generator, a rotor with a plurality of blades defining a rotor swept area between a maximum height and a minimum height, and operationally connected with the generator, a pitch mechanism for each of the blades for rotating the blades around their longitudinal axes, determining pitch angles for the blades and having a maximum pitch speed, and a yaw system for rotating the nacelle around a longitudinal axis of the tower, the method comprising:

measuring during a measuring time a wind speed and a wind direction at at least three measuring heights between the maximum and minimum height at the wind site;

determining an average wind speed and an average wind direction for each of the measuring heights during the measuring time;

determining a wind speed distribution and wind direction distribution between the maximum height and the minimum height based on the average wind speed and average wind direction for each of the measuring heights and linearly interpolating between the measuring heights;

determining a desired angle of attack cycle as a function of an azimuth position of a rotor blade along the rotor swept area for a representative portion of the blade based on the wind speed distribution;

determining a yaw angle based on the wind direction distribution and taking into account the desired angle of attack cycle as a function of the azimuth position and the maximum pitch speed; and determining a pitch angle cycle as a function of the azimuth position of the rotor blade based on the desired angle of attack cycle and the determined yaw angle.

20. A wind turbine comprising a support structure, a nacelle rotatably mounted upon the support structure, a generator and a system for varying a torque of the generator, a rotor with a plurality of blades defining a rotor swept area between a maximum height and a minimum height, and operationally connected with the generator, a pitch mechanism for each of the blades for rotating the blades around their longitudinal axes and determining pitch angles for the blades, and a yaw system for rotating the nacelle around a longitudinal axis of the tower, a wind speed measurement system for directly or indirectly measuring a representative wind speed, an azimuth measurement system for determining an azimuth angle for each of the rotor blades, and a local wind turbine control system configured to receive a yaw angle and a pitch angle cycle receive the representative wind speed from the wind speed measurement system, receive the azimuth angles for each of the rotor blades, determine a uniform pitch angle and a uniform generator torque for the representative wind speed, determining an instantaneous pitch angle for each of the blades by summing the uniform pitch angle with a pitch angle corresponding to the instantaneous azimuth position according to the selected pitch angle cycle, and send control signals to the yaw system, the pitch mechanisms and the system for varying the torque of the generator, such that blades are rotated according to the instantaneous pitch angles for each of the blades, the nacelle is rotated according to the selected yaw angle, and the uniform generator torque is applied to the generator.

* * * * *